US012806893B2

(12) United States Patent
McGuire, Jr.

(10) Patent No.: US 12,806,893 B2
(45) Date of Patent: *Nov. 24, 2026

(54) PROTECTED GRAPHICS AND RELATED METHODS

(71) Applicant: PPG Advanced Surface Technologies, LLC, Columbus, OH (US)

(72) Inventor: James E. McGuire, Jr., Palm Beach, FL (US)

(73) Assignee: PPG Advanced Surface Technologies, LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,036

(22) Filed: Aug. 18, 2024

(65) Prior Publication Data

US 2024/0408860 A1 Dec. 12, 2024

Related U.S. Application Data

(63) Continuation of application No. 18/108,784, filed on Feb. 13, 2023, now Pat. No. 12,076,969, which is a (Continued)

(51) Int. Cl.

*B32B 37/18* (2006.01)
*B32B 27/08* (2006.01)

(Continued)

(52) U.S. Cl.

CPC ............ *B32B 37/182* (2013.01); *B32B 27/08* (2013.01); *B32B 27/18* (2013.01); *B32B 27/22* (2013.01);

(Continued)

(58) Field of Classification Search

CPC .......... B32B 2250/24; B32B 2307/306; B32B 2307/4026; B32B 2307/406;

(Continued)

(56) References Cited

U.S. PATENT DOCUMENTS 2,871,218 A 1/1959 Schollenberger
2,914,556 A 11/1959 Hostettler et al.

(Continued)

FOREIGN PATENT DOCUMENTS

AU 572168 B2 5/1988
CN 101228030 B 4/2011

(Continued)

OTHER PUBLICATIONS

"Scotchgard Paint Protection Film SGPF6 For Professional Applicators," 3M Technical Data Sheet 75-3469-1065-8, Minnesota Mining & Manufacturing Co. (St. Paul, MN) (Apr. 2004).

(Continued)

*Primary Examiner* — Lawrence D Ferguson

(57) ABSTRACT

An improved protected graphics assembly according to the invention comprises the following sequential layers: optionally, at least one adhesive layer; at least one graphics layer; and at least one outwardly exposed polymer layer that is essentially free of low surface energy materials and has a gloss value of greater than 90 when tested according to ASTM D2457-03 at a 60-degree angle. The assembly is beneficially applied to a variety of articles and used in a variety of related methods. In an exemplary embodiment, a race car comprises a protected graphics assembly that comprises: optionally, at least one adhesive layer; at least one outwardly exposed polymer layer that is essentially free of low surface energy materials; and at least one graphics layer substantially protected from exterior exposure by the polymer layer.

14 Claims, 1 Drawing Sheet

100

Related U.S. Application Data continuation of application No. 17/160,732, filed on Jan. 28, 2021, now Pat. No. 11,577,501, which is a continuation of application No. 12/017,031, filed on Jan. 19, 2008, now Pat. No. 10,981,371.

(51) Int. Cl.

| | |
|---|---|
| ***B32B 27/18*** | (2006.01) |
| ***B32B 27/22*** | (2006.01) |
| ***B32B 27/40*** | (2006.01) |
| ***B32B 37/12*** | (2006.01) |
| ***B44C 1/10*** | (2006.01) |
| *B44C 1/165* | (2006.01) |
| *B44C 1/17* | (2006.01) |
| *G09F 21/06* | (2006.01) |
| *G09F 21/08* | (2006.01) |

(52) U.S. Cl.

CPC .............. *B32B 27/40* (2013.01); *B32B 37/12* (2013.01); *B44C 1/105* (2013.01); *B32B 2250/24* (2013.01); *B32B 2307/306* (2013.01); *B32B 2307/4026* (2013.01); *B32B 2307/406* (2013.01); *B32B 2307/546* (2013.01); *B32B 2307/554* (2013.01); *B32B 2307/71* (2013.01); *B32B 2307/714* (2013.01); *B32B 2307/718* (2013.01); *B32B 2451/00* (2013.01); *B32B 2605/00* (2013.01); *B32B 2605/08* (2013.01); *B44C 1/165* (2013.01); *B44C 1/1733* (2013.01); *G09F 21/06* (2013.01); *G09F 21/08* (2013.01); *Y10T 156/10* (2015.01); *Y10T 428/24802* (2015.01); *Y10T 428/2495* (2015.01); *Y10T 428/26* (2015.01); *Y10T 428/31504* (2015.04); *Y10T 428/31551* (2015.04)

(58) Field of Classification Search

CPC ........ B32B 2307/546; B32B 2307/554; B32B 2307/71; B32B 2307/714; B32B 2307/718; B32B 2451/00; B32B 2605/00; B32B 2605/08; B32B 27/08; B32B 27/18; B32B 27/22; B32B 27/40; B32B 37/12; B32B 37/182; B44C 1/105; B44C 1/165; B44C 1/1733; G09F 21/06; G09F 21/08; Y10T 156/10; Y10T 428/24802; Y10T 428/2495; Y10T 428/26; Y10T 428/31504; Y10T 428/31551

See application file for complete search history.

(56) References Cited

U.S. PATENT DOCUMENTS 3,294,724 A 12/1966 Axelrood
3,296,196 A 1/1967 Lamoreaux
3,463,662 A 8/1969 Hodes
3,509,015 A 4/1970 Wismer et al.
3,523,100 A 8/1970 Stein et al.
3,523,101 A 8/1970 Reuter
3,539,424 A 11/1970 Tashlick
3,549,583 A 12/1970 Nagata et al.
3,554,951 A 1/1971 Blomeyer et al.
3,616,198 A 10/1971 Saito
3,661,672 A 5/1972 Mcquade, Jr.
3,689,346 A 9/1972 Rowland
3,695,972 A 10/1972 Lind et al.
3,867,350 A 2/1975 Pedain et al.
3,899,467 A 8/1975 Bonk et al.
3,899,621 A 8/1975 Willdorf
4,007,151 A 2/1977 Ogawa et al.
4,034,708 A 7/1977 Fielder et al.
4,081,578 A 3/1978 van Essen et al.
4,092,198 A 5/1978 Scher et al.
4,092,199 A 5/1978 Ungar et al.
4,093,766 A 6/1978 Scher et al.
4,101,698 A 7/1978 Dunning et al.
4,131,602 A 12/1978 Hodakowski et al.
4,154,882 A 5/1979 Ungar et al.
4,181,752 A 1/1980 Martens et al.
4,201,799 A 5/1980 Stephens
4,207,356 A 6/1980 Waugh
4,241,140 A 12/1980 Ammons
4,292,827 A 10/1981 Waugh
4,296,156 A 10/1981 Lustig et al.
4,302,550 A 11/1981 Pisaric et al.
4,332,074 A 6/1982 Auld et al.
4,371,686 A 2/1983 Yamamoto et al.
4,387,129 A 6/1983 Vincent
4,420,525 A 12/1983 Parks
4,476,293 A 10/1984 Robinson
4,496,628 A 1/1985 Deatcher et al.
4,501,852 A 2/1985 Markusch et al.
4,530,976 A 7/1985 Kordomenos et al.
4,540,622 A 9/1985 Brunion et al.
4,550,052 A 10/1985 Malek
4,578,426 A 3/1986 Lenz et al.
4,590,218 A 5/1986 Vass
4,611,043 A 9/1986 Bruson et al.
4,649,162 A 3/1987 Roche et al.
4,652,494 A 3/1987 Bravet et al.
4,657,795 A 4/1987 Foret
4,705,721 A 11/1987 Frisch et al.
4,741,961 A 5/1988 Frisch et al.
4,745,152 A 5/1988 Fock et al.
4,748,192 A 5/1988 Smith
4,751,121 A 6/1988 Kuhnel et al.
4,766,038 A 8/1988 de Vroom
4,774,043 A 9/1988 Beckmann
4,810,540 A 3/1989 Ellison et al.
4,816,542 A 3/1989 Liebl et al.
4,900,611 A 2/1990 Carroll, Jr.
4,913,760 A 4/1990 Benson et al.
4,917,928 A 4/1990 Heinecke
4,919,994 A 4/1990 Incremona et al.
4,921,776 A 5/1990 Taylor, Jr.
4,931,324 A 6/1990 Ellison et al.
4,933,237 A 6/1990 Krenceski et al.
4,948,654 A 8/1990 Brooks et al.
4,966,527 A 10/1990 Merz
5,000,903 A 3/1991 Matzinger et al.
5,034,275 A 7/1991 Pearson et al.
5,055,346 A 10/1991 Rohrbacher
5,070,172 A 12/1991 Hirai et al.
5,077,373 A 12/1991 Tsuda et al.
5,114,514 A 5/1992 Landis
5,114,789 A 5/1992 Reafler
5,123,814 A 6/1992 Burdick et al.
5,141,783 A 8/1992 Corsi et al.
5,148,574 A 9/1992 Leclere et al.
5,155,201 A 10/1992 Gardon et al.
5,183,597 A 2/1993 Lu
5,203,189 A 4/1993 Lovejoy et al.
5,215,811 A 6/1993 Reafler et al.
5,219,643 A 6/1993 Schmidt et al.
5,232,527 A 8/1993 Vernhet et al.
5,242,744 A 9/1993 Schryer
5,242,751 A 9/1993 Hartman
5,260,095 A 11/1993 Affinito
5,268,215 A 12/1993 Krenceski et al.
5,288,356 A 2/1994 Benefiel
5,306,548 A 4/1994 Zabrocki et al.
5,310,080 A 5/1994 Figge, Sr.
5,334,450 A 8/1994 Zabrocki et al.
5,342,666 A 8/1994 Ellison et al.
5,391,686 A 2/1995 Jadhav et al.
5,403,615 A 4/1995 Winkler et al.
5,403,880 A 4/1995 Hegedus et al.
5,405,675 A 4/1995 Sawka et al.
5,428,087 A 6/1995 Petit et al.
5,468,532 A 11/1995 Ho et al.
5,478,596 A 12/1995 Gurney

(56) References Cited

U.S. PATENT DOCUMENTS

| | | | |
|---|---|---|---|
| 5,486,096 | A | 1/1996 | Hertel et al. |
| 5,518,786 | A | 5/1996 | Johnson et al. |
| 5,556,677 | A | 9/1996 | Quigley et al. |
| 5,560,979 | A | 10/1996 | Bloom et al. |
| 5,562,979 | A | 10/1996 | Easterlow et al. |
| 5,563,206 | A | 10/1996 | Eicken et al. |
| 5,567,502 | A | 10/1996 | Miyabara et al. |
| 5,582,887 | A | 12/1996 | Etheredge |
| 5,587,230 | A | 12/1996 | Lin et al. |
| 5,604,006 | A | 2/1997 | Ponchaud et al. |
| 5,614,297 | A | 3/1997 | Velazquez |
| 5,620,819 | A | 4/1997 | Conforti et al. |
| 5,641,374 | A | 6/1997 | Peterson et al. |
| 5,688,571 | A | 11/1997 | Quigley et al. |
| 5,691,846 | A | 11/1997 | Benson, Jr. et al. |
| 5,707,941 | A | 1/1998 | Haberle |
| 5,714,305 | A | 2/1998 | Teng et al. |
| 5,736,204 | A | 4/1998 | Suskind |
| 5,768,285 | A | 6/1998 | Griep et al. |
| 5,770,313 | A | 6/1998 | Furumoto et al. |
| 5,786,285 | A | 7/1998 | Walla et al. |
| 5,820,491 | A | 10/1998 | Hatch et al. |
| 5,848,769 | A | 12/1998 | Fronek et al. |
| 5,849,168 | A | 12/1998 | Lutz |
| 5,858,495 | A | 1/1999 | Eikmeier et al. |
| 5,866,257 | A | 2/1999 | Schledjewski et al. |
| 5,877,254 | A | 3/1999 | La Casse et al. |
| 5,882,775 | A | 3/1999 | Matsui et al. |
| 5,912,081 | A | 6/1999 | Negele et al. |
| 5,912,193 | A | 6/1999 | Iwata et al. |
| 5,912,195 | A | 6/1999 | Walla et al. |
| 5,928,778 | A | 7/1999 | Takahashi et al. |
| 5,939,188 | A | 8/1999 | Moncur et al. |
| 5,945,199 | A | 8/1999 | Morin et al. |
| 5,955,204 | A | 9/1999 | Yamamoto et al. |
| 5,965,256 | A | 10/1999 | Barrera |
| 5,968,444 | A | 10/1999 | Yamamoto |
| 5,985,079 | A | 11/1999 | Ellison |
| 6,001,906 | A | 12/1999 | Golumbic |
| 6,037,054 | A | 3/2000 | Shirai et al. |
| 6,045,864 | A | 4/2000 | Lyons et al. |
| 6,054,208 | A | 4/2000 | Rega et al. |
| 6,071,583 | A | 6/2000 | Pomerantz |
| 6,096,396 | A | 8/2000 | Patton et al. |
| 6,132,864 | A | 10/2000 | Kiriazis et al. |
| 6,150,035 | A | 11/2000 | DeFife et al. |
| 6,153,718 | A | 11/2000 | Imashiro et al. |
| 6,177,189 | B1 | 1/2001 | Rawlings et al. |
| 6,191,221 | B1 | 2/2001 | McAmish et al. |
| 6,210,295 | B1 | 4/2001 | Yoneyama |
| 6,210,796 | B1 | 4/2001 | Lobert et al. |
| 6,254,712 | B1 | 7/2001 | Enlow et al. |
| 6,258,918 | B1 | 7/2001 | Ho et al. |
| 6,319,353 | B1 | 11/2001 | Bernhard |
| 6,336,666 | B1 | 1/2002 | Trantoul |
| 6,336,988 | B1 | 1/2002 | Enlow et al. |
| 6,369,186 | B1 | 4/2002 | Branlard et al. |
| 6,383,644 | B2 | 5/2002 | Fuchs |
| 6,389,602 | B1 | 5/2002 | Alsaffar |
| 6,399,193 | B1 | 6/2002 | Ellison |
| 6,436,531 | B1 | 8/2002 | Kollaja et al. |
| 6,458,875 | B1 | 10/2002 | Sandlin et al. |
| 6,458,880 | B1 | 10/2002 | Onder et al. |
| 6,475,559 | B1 | 11/2002 | Bettinger |
| 6,475,616 | B1 | 11/2002 | Dietz et al. |
| 6,479,142 | B1 | 11/2002 | Condon et al. |
| 6,485,836 | B2 | 11/2002 | Reihs et al. |
| 6,518,359 | B1 | 2/2003 | Clemens et al. |
| 6,518,389 | B1 | 2/2003 | Kaufhold et al. |
| 6,521,164 | B1 | 2/2003 | Plummer et al. |
| 6,521,337 | B2 | 2/2003 | Yanagiuchi |
| 6,579,601 | B2 | 6/2003 | Kollaja et al. |
| 6,592,173 | B2 | 7/2003 | Hardgrove et al. |
| 6,602,591 | B1 | 8/2003 | Smith |
| 6,607,831 | B2 | 8/2003 | Ho et al. |
| 6,612,944 | B1 | 9/2003 | Bureau |
| 6,624,276 | B2 | 9/2003 | Lamers et al. |
| 6,627,018 | B1 | 9/2003 | Michael |
| 6,638,467 | B1 | 10/2003 | Yamamoto |
| 6,642,159 | B1 | 11/2003 | Bhatnagar et al. |
| 6,649,003 | B1 | 11/2003 | Spain et al. |
| 6,649,693 | B2 | 11/2003 | Konishi et al. |
| 6,651,011 | B1 | 11/2003 | Bache |
| 6,659,625 | B2 | 12/2003 | Hanasaki |
| 6,673,428 | B1 | 1/2004 | Reafler |
| 6,677,028 | B1 | 1/2004 | Lasch et al. |
| 6,680,111 | B1 | 1/2004 | Leibler et al. |
| 6,682,679 | B1 | 1/2004 | Marentic et al. |
| 6,709,723 | B2 | 3/2004 | Roys et al. |
| 6,709,748 | B1 | 3/2004 | Ho et al. |
| 6,713,185 | B2 | 3/2004 | Carlson, Jr. et al. |
| 6,723,427 | B1 | 4/2004 | Johnson et al. |
| 6,723,472 | B2 | 4/2004 | Nakanishi et al. |
| 6,726,971 | B1 | 4/2004 | Wong |
| 6,730,388 | B2 | 5/2004 | MacQueen et al. |
| 6,733,870 | B2 | 5/2004 | Enlow et al. |
| 6,734,273 | B2 | 5/2004 | Onder |
| 6,753,056 | B1 | 6/2004 | Mizumoto |
| 6,755,757 | B2 | 6/2004 | Sutherland |
| 6,762,243 | B2 | 7/2004 | Stender et al. |
| 6,770,360 | B2 | 8/2004 | Mientus et al. |
| 6,790,525 | B2 | 9/2004 | Takeuchi et al. |
| 6,790,526 | B2 | 9/2004 | Vargo et al. |
| 6,797,098 | B2 | 9/2004 | Watanabe et al. |
| 6,806,212 | B2 | 10/2004 | Fyfe |
| 6,811,628 | B1 | 11/2004 | Reid et al. |
| 6,824,818 | B2 | 11/2004 | McCoy et al. |
| 6,824,834 | B2 | 11/2004 | Schafheutle et al. |
| 6,827,895 | B1 | 12/2004 | Yamamoto |
| 6,835,267 | B1 | 12/2004 | Spain et al. |
| 6,835,367 | B2 | 12/2004 | James et al. |
| 6,838,130 | B1 | 1/2005 | Spain et al. |
| 6,852,268 | B1 | 2/2005 | Delusky et al. |
| 6,852,377 | B2 | 2/2005 | Nicolai et al. |
| 6,852,418 | B1 | 2/2005 | Claus et al. |
| 6,866,383 | B2 | 3/2005 | Naik et al. |
| 6,869,496 | B1 | 3/2005 | Kollaja et al. |
| 6,881,856 | B2 | 4/2005 | Tanaka et al. |
| 6,890,628 | B2 | 5/2005 | Kerr |
| 6,893,596 | B2 | 5/2005 | Haas et al. |
| 6,894,084 | B2 | 5/2005 | Kovar et al. |
| 6,908,401 | B2 | 6/2005 | Cheng |
| 6,966,962 | B2 | 11/2005 | Spain et al. |
| 6,998,084 | B2 | 2/2006 | Horansky |
| 7,005,103 | B2 | 2/2006 | Smith et al. |
| 7,005,183 | B2 | 2/2006 | Kondo |
| 7,005,794 | B2 | 2/2006 | Watanabe et al. |
| 7,011,777 | B2 | 3/2006 | Schmidt |
| 7,048,989 | B2 | 5/2006 | Watkins et al. |
| 7,074,463 | B2 | 7/2006 | Jones et al. |
| 7,108,618 | B2 | 9/2006 | Frischmon et al. |
| 7,128,669 | B2 | 10/2006 | Blotteaux |
| 7,138,466 | B2 | 11/2006 | Hung et al. |
| 7,141,294 | B2 | 11/2006 | Sakurai et al. |
| 7,141,303 | B2 | 11/2006 | Clemens et al. |
| 7,151,151 | B2 | 12/2006 | Richter et al. |
| 7,157,527 | B2 | 1/2007 | Kuntimaddi et al. |
| 7,157,572 | B2 | 1/2007 | Lee |
| 7,160,973 | B2 | 1/2007 | Ohrbom et al. |
| 7,166,249 | B2 | 1/2007 | Abrams et al. |
| 7,279,057 | B2 | 10/2007 | Reid et al. |
| 7,282,533 | B2 | 10/2007 | Kreitschmann et al. |
| 7,316,832 | B2 | 1/2008 | Steinhardt et al. |
| RE40,723 | E | 6/2009 | Matsui et al. |
| 7,854,985 | B2 | 12/2010 | Song et al. |
| 7,931,954 | B2 | 4/2011 | Kobayashi et al. |
| 8,013,099 | B2 | 9/2011 | Poppe et al. |
| 8,062,451 | B2 | 11/2011 | Mozer et al. |
| 8,071,000 | B2 | 12/2011 | Neitzke |
| 8,105,686 | B2 | 1/2012 | Blackwell et al. |
| 8,117,679 | B2 | 2/2012 | Pierce |
| 8,501,315 | B2 | 8/2013 | Tanaka et al. |
| 8,545,959 | B2 | 10/2013 | McGuire, Jr. et al. |
| 8,545,960 | B2 | 10/2013 | McGuire, Jr. et al. |

(56) References Cited

U.S. PATENT DOCUMENTS

| | | | |
|---|---|---|---|
| 8,551,279 | B2 | 10/2013 | Johnson et al. |
| 8,568,849 | B2 | 10/2013 | Shi et al. |
| 8,765,263 | B2 | 7/2014 | Ho et al. |
| 8,828,303 | B2 | 9/2014 | McGuire, Jr. et al. |
| 8,927,106 | B2 | 1/2015 | Ho et al. |
| 9,292,128 | B1 | 3/2016 | Huang |
| 9,790,318 | B2 | 10/2017 | McGuire, Jr. et al. |
| 10,253,209 | B2 | 4/2019 | Fuchs |
| 10,981,371 | B2 | 4/2021 | McGuire, Jr. |
| 11,420,427 | B2 | 8/2022 | McGuire, Jr. |
| 11,577,501 | B2 | 2/2023 | McGuire, Jr. |
| 2002/0006516 | A1 | 1/2002 | Ito et al. |
| 2002/0015772 | A1 | 2/2002 | Munch et al. |
| 2002/0015842 | A1 | 2/2002 | Yanagiuchi |
| 2002/0018889 | A1 | 2/2002 | Franck et al. |
| 2002/0027362 | A1 | 3/2002 | Trantoul |
| 2002/0061374 | A1 | 5/2002 | Frank |
| 2002/0132049 | A1 | 9/2002 | Leonard et al. |
| 2002/0146568 | A1 | 10/2002 | Ho et al. |
| 2002/0157772 | A1 | 10/2002 | Enlow et al. |
| 2002/0193460 | A1 | 12/2002 | Kovar et al. |
| 2002/0195910 | A1 | 12/2002 | Hus et al. |
| 2003/0003282 | A1 | 1/2003 | Roys et al. |
| 2003/0026932 | A1 | 2/2003 | Johnson et al. |
| 2003/0060574 | A1 | 3/2003 | Muller et al. |
| 2003/0075264 | A1 | 4/2003 | Terakado et al. |
| 2003/0138842 | A1 | 7/2003 | Seul et al. |
| 2003/0148044 | A1 | 8/2003 | Auld et al. |
| 2003/0203190 | A1 | 10/2003 | Schmidt et al. |
| 2003/0211334 | A1 | 11/2003 | Jones |
| 2004/0048073 | A1 | 3/2004 | Bacon, Jr. |
| 2004/0071980 | A1 | 4/2004 | McBain et al. |
| 2004/0096630 | A1 | 5/2004 | Sakurai et al. |
| 2004/0145092 | A1 | 7/2004 | Mccollum et al. |
| 2004/0159969 | A1 | 8/2004 | Truog et al. |
| 2004/0161567 | A1 | 8/2004 | Truog et al. |
| 2004/0170793 | A1 | 9/2004 | Linden et al. |
| 2004/0197572 | A1 | 10/2004 | Bell |
| 2004/0200564 | A1 | 10/2004 | Kinsey et al. |
| 2004/0208998 | A1 | 10/2004 | Steininger et al. |
| 2004/0209057 | A1 | 10/2004 | Enlow et al. |
| 2004/0214007 | A1 | 10/2004 | Brown et al. |
| 2005/0042431 | A1 | 2/2005 | Wagenblast |
| 2005/0059309 | A1 | 3/2005 | Tsotsis |
| 2005/0069686 | A1 | 3/2005 | Hoops |
| 2005/0069698 | A1 | 3/2005 | Eubanks et al. |
| 2005/0084696 | A1 | 4/2005 | Gaggar et al. |
| 2005/0113194 | A1 | 5/2005 | Pearson |
| 2005/0136205 | A1 | 6/2005 | Stoppelmann et al. |
| 2005/0137375 | A1 | 6/2005 | Hansen et al. |
| 2005/0148404 | A1 | 7/2005 | Ignatius |
| 2005/0156358 | A1 | 7/2005 | Bellefleur et al. |
| 2005/0159060 | A1 | 7/2005 | Shao |
| 2005/0164008 | A1 | 7/2005 | Rukavina |
| 2005/0175794 | A1 | 8/2005 | Dathe |
| 2005/0175818 | A1 | 8/2005 | Kawabata et al. |
| 2005/0181203 | A1 | 8/2005 | Rawlings et al. |
| 2005/0186415 | A1 | 8/2005 | McCormick et al. |
| 2005/0191490 | A1 | 9/2005 | Ton-That et al. |
| 2005/0214559 | A1 | 9/2005 | Minoda et al. |
| 2006/0046028 | A1 | 3/2006 | Kaminski et al. |
| 2006/0127666 | A1 | 6/2006 | Fuchs |
| 2007/0036929 | A1 | 2/2007 | Baird et al. |
| 2007/0047099 | A1 | 3/2007 | Clemens et al. |
| 2007/0116933 | A1 | 5/2007 | Kobayashi et al. |
| 2007/0149749 | A1 | 6/2007 | Rukavina et al. |
| 2007/0166548 | A1 | 7/2007 | Gruber et al. |
| 2007/0178239 | A1 | 8/2007 | Kestell et al. |
| 2008/0003406 | A1 | 1/2008 | Steelman |
| 2008/0026233 | A1 | 1/2008 | Kunz et al. |
| 2008/0199704 | A1 | 8/2008 | Ho et al. |
| 2008/0261014 | A1 | 10/2008 | McGuire et al. |
| 2008/0286576 | A1 | 11/2008 | McGuire, Jr. |
| 2009/0186198 | A1 | 7/2009 | McGuire, Jr. |
| 2009/0260741 | A1 | 10/2009 | Anderson |
| 2009/0292057 | A1 | 11/2009 | Handa et al. |
| 2009/0297724 | A1 | 12/2009 | Weber |
| 2010/0059167 | A1 | 3/2010 | McGuire, Jr. |
| 2010/0062250 | A1 | 3/2010 | Johnson et al. |
| 2010/0068446 | A1 | 3/2010 | McGuire |
| 2010/0089434 | A1 | 4/2010 | Fishman |
| 2011/0045306 | A1 | 2/2011 | Johnson et al. |
| 2011/0064900 | A1 | 3/2011 | Uesugi et al. |
| 2011/0133598 | A1 | 6/2011 | Jenninger et al. |
| 2011/0137006 | A1 | 6/2011 | McGuire, Jr. et al. |
| 2011/0241261 | A1 | 10/2011 | McGuire, Jr. et al. |
| 2011/0268964 | A1 | 11/2011 | Dornbusch et al. |
| 2012/0160402 | A1 | 6/2012 | Ho et al. |
| 2012/0220913 | A1 | 8/2012 | Kosthorst et al. |
| 2012/0255562 | A1 | 10/2012 | McGuire, Jr. |
| 2013/0045371 | A1 | 2/2013 | Dennis |
| 2013/0099829 | A1 | 4/2013 | Vilander et al. |
| 2013/0316115 | A1 | 11/2013 | Smith et al. |
| 2014/0030462 | A1 | 1/2014 | Sullivan |
| 2014/0212674 | A1 | 7/2014 | Ho et al. |
| 2014/0295181 | A1 | 10/2014 | Minomo et al. |
| 2015/0044456 | A1 | 2/2015 | Chien et al. |
| 2015/0099113 | A1 | 4/2015 | Ho et al. |
| 2015/0166831 | A1 | 6/2015 | Kuehneweg et al. |
| 2015/0169089 | A1 | 6/2015 | Dixon et al. |
| 2015/0330231 | A1 | 11/2015 | McGuire et al. |
| 2015/0361306 | A1 | 12/2015 | McGuire, Jr. |
| 2016/0062016 | A1 | 3/2016 | Lee et al. |
| 2016/0103250 | A1 | 4/2016 | Snyder et al. |
| 2016/0251552 | A1 | 9/2016 | Das et al. |
| 2018/0163093 | A1 | 6/2018 | McGuire, Jr. et al. |
| 2018/0163094 | A1 | 6/2018 | McGuire, Jr. et al. |
| 2018/0194973 | A1 | 7/2018 | McGuire, Jr. |
| 2018/0291236 | A1 | 10/2018 | McGuire, Jr. |
| 2019/0136095 | A1 | 5/2019 | McGuire, Jr. et al. |
| 2019/0161646 | A1 | 5/2019 | McGuire, Jr. et al. |
| 2019/0238171 | A1 | 8/2019 | McGuire, Jr. |
| 2021/0163791 | A1 | 6/2021 | McGuire, Jr. et al. |
| 2021/0171807 | A1 | 6/2021 | McGuire, Jr. et al. |

FOREIGN PATENT DOCUMENTS

| | | | |
|---|---|---|---|
| CN | 102027088 | B | 11/2014 |
| DE | 2600241 | A1 | 7/1977 |
| DE | 19715871 | C1 | 6/1998 |
| DE | 10214827 | C1 | 10/2003 |
| EP | 0271941 | B1 | 9/1990 |
| EP | 0251546 | B1 | 3/1992 |
| EP | 0978374 | A2 | 2/2000 |
| EP | 1144125 | B1 | 7/2003 |
| EP | 0808885 | B1 | 4/2004 |
| EP | 1004608 | B1 | 10/2004 |
| EP | 1386950 | B1 | 5/2005 |
| EP | 1481031 | B1 | 7/2007 |
| EP | 1874541 | B1 | 11/2011 |
| EP | 2371881 | B1 | 8/2014 |
| EP | 1937475 | B1 | 9/2017 |
| EP | 2944565 | B1 | 9/2017 |
| EP | 2463093 | B1 | 11/2019 |
| EP | 2076388 | B1 | 12/2019 |
| EP | 2463094 | B1 | 12/2019 |
| EP | 2404729 | B1 | 6/2020 |
| EP | 2340164 | B1 | 3/2021 |
| EP | 2818488 | B1 | 10/2021 |
| FR | 2762336 | A1 | 10/1998 |
| GB | 1590413 | A | 6/1981 |
| GB | 2021599 | B | 2/1983 |
| GB | 2194951 | B | 1/1990 |
| JP | 58-136438 | A1 | 8/1983 |
| JP | H02169228 | A | 6/1990 |
| JP | H05339816 | A | 12/1993 |
| JP | H06143506 | A | 5/1994 |
| JP | H0752176 | A | 2/1995 |
| JP | H0774322 | A | 3/1995 |
| JP | H11506707 | A | 6/1999 |
| JP | 2000260252 | A | 9/2000 |
| JP | 2001011403 | A | 1/2001 |
| JP | 2001253033 | A | 9/2001 |
| JP | 2003027016 | A | 1/2003 |

(56) References Cited

FOREIGN PATENT DOCUMENTS

| | | | |
|---|---|---|---|
| JP | 2003527258 | A | 9/2003 |
| JP | 2004511614 | A | 4/2004 |
| JP | 2004307532 | A | 11/2004 |
| JP | 2005125506 | A | 5/2005 |
| JP | 2005206724 | A | 8/2005 |
| JP | 2005335120 | A | 12/2005 |
| JP | 2007522972 | A | 8/2007 |
| JP | 2008539107 | A | 11/2008 |
| JP | 2009515745 | A | 4/2009 |
| JP | 2009096186 | A | 5/2009 |
| JP | 2009299035 | A | 12/2009 |
| JP | 2013237216 | A | 11/2013 |
| JP | 2014145034 | A | 8/2014 |
| JP | 2016525742 | A | 8/2016 |
| KR | 101221441 | B1 | 1/2013 |
| KR | 101353366 | B1 | 1/2014 |
| KR | 101419056 | B1 | 7/2014 |
| WO | 1990011878 | A1 | 10/1990 |
| WO | 1992002731 | A1 | 2/1992 |
| WO | 1992016367 | A1 | 10/1992 |
| WO | 1992022619 | A1 | 12/1992 |
| WO | 1993024551 | A1 | 12/1993 |
| WO | 1994013465 | A1 | 6/1994 |
| WO | 1996010595 | A1 | 4/1996 |
| WO | 1997028472 | A1 | 8/1997 |
| WO | 1998037115 | A1 | 8/1998 |
| WO | 2001029144 | A1 | 4/2001 |
| WO | 2002028636 | A1 | 4/2002 |
| WO | 2002031074 | A1 | 4/2002 |
| WO | 2003002680 | A1 | 1/2003 |
| WO | 2003049942 | A1 | 6/2003 |
| WO | 2003074273 | A1 | 9/2003 |
| WO | 2003076542 | A1 | 9/2003 |
| WO | 2004067246 | A2 | 8/2004 |
| WO | 2005032812 | A2 | 4/2005 |
| WO | 2006118883 | A2 | 11/2006 |
| WO | 2007033786 | A1 | 3/2007 |
| WO | 2007048141 | A2 | 4/2007 |
| WO | 2007048145 | A2 | 4/2007 |
| WO | 2007120188 | A2 | 10/2007 |
| WO | 2008051629 | A2 | 5/2008 |
| WO | 2008109733 | A1 | 9/2008 |
| WO | 2009041964 | A1 | 4/2009 |
| WO | 2010036981 | A1 | 4/2010 |
| WO | 2014209928 | A1 | 12/2014 |
| WO | 2015195494 | A1 | 12/2015 |
| WO | 2016018749 | A1 | 2/2016 |
| WO | 2016076337 | A1 | 5/2016 |
| WO | 2017156506 | A1 | 9/2017 |
| WO | 2017156507 | A1 | 9/2017 |
| WO | 2018045353 | A1 | 3/2018 |
| WO | 2018057378 | A1 | 3/2018 |
| WO | 2018057379 | A1 | 3/2018 |

OTHER PUBLICATIONS

"Scotchgard Paint Protection Film: Application Guide for Professional Applicators," 3M Technical Update 75-3469-1102-9, Minnesota Mininq & Manufacturing Co. (St. Paul, MN) (Apr. 2004).

"Test Report—Venture Shield 7510," Bodycote Materials Testing Met-Chem Laboratory, published at: http://www.invisiblepatterns.com/pdf/067682.pdf, Letter Dated Jan. 14, 2003—Report No. 067682 (Jan. 14, 2003).

"Venture Shield—Paint Protection 7512", VentureTape (Rockland, MA), published at: http://www.venturetape.com/final/automotive_products.asp?id=610 (Jul. 12, 2005).

Venture Shield—Paint Protection 7510, VentureTape (Rockland, MA), published at: http://www.venturetape.com/final/automotive_products.asp?id=610 (Jul. 12, 2005).

"Aircraft Painting," KLM Engineering & Maintenance, www.klm-em.com (Jun. 27, 2007).

"An Amazing New Automotive Finish Protection Film to Keep Your Vehicle in Showroom Condition . . . VentureShield," (http://www.venturetape.com/final/new_products.htm) VentureTape (Rockland, MA).

"Argotec 49510 Technical Data Sheet," Argotech, Inc. (Greenfield, MA) (Oct. 2003).

"Argotec Fills Industry Need with Thin, Aliphatic-Grade Polyurethane Films," Argotec Press Release, www.argotecinc.com (2006).

"Avery Dennison StoneShield Technical Data Sheet".

"Epoxy Curing Agents and Modifiers: Ancamine 2441 Curing Agent," Air Products and Chemicals (Allentown, PA) Publication No. 125-04-017-GLB (2004).

"Ford Pressure Sensitive Performance Testing (Venture Tape) for Test Materials: 7510 and 7514," ACT Laboratories, Inc. (Hillsdale, MI), published at: http://www.invisiblepatterns.com/pdf/AIN154314C.pdf, (Dec. 30, 2005).

"Improved Scotchgard Paint Protection Film Uses Latest 3M Technology," 3M News: SEMA Show 2005, (Nov. 1, 2005).

"Paint Protection Film FAQ's," previously published at: http://enprodistributing.com/products/protection/faq.htm, (Jul. 12, 2005).

"Polyurethane Coatings for Automotive Exteriors," published at: http://www.bayermaterialscienceafta.com/industries/automotive/coatings.html#3.

"EPON Resin 863 Technical Data Sheet," Hexion Specialty Chemicals (Houston, TX) RP:4041 (Jun. 2004).

"EPON Resin Structural Reference Manual—EPON Resins—EPI-Cure Curing Agents—Heloxy Modifiers," Resolution Performance Products (Houston, TX), DD. 3i to 3-6 (2001).

"EPON Resins and Modifiers," Resolution Performance Products SC:3059-01 (2002).

"Epoxy Curing Agents and Modifiers: Amicure CG-1200 Curing Agent," Air Products and Chemicals (Allentown, PA) Publication No. 125-9416.7.

"Epoxy Curing Agents and Modifiers: Amicure UR Curing Agent," Air Products and Chemicals (Allentown, PA) Publication No. 125-9416.11.

"Blade Protection Kits Keep Helicopters in the Air," EngineeringTalk (www.engineeringtalk.com/news/mmr/mmr102.html) (Sep. 16, 2005).

"Cab-O-Sil TS-720," Cabot Corporation (Billerica, MA) PDS-141 (Jan. 2006).

"Eclipse High Performance Exterior Topcoat," Akzo Nobel Aerospace Coatings, www.akzonobelaerospace.com.

"EPON Resin 828 Product Bulletin", Resolution Performance Products (Houston, TX) RP:3075-01 (Apr. 2002).

"EPON Resin 862 Product Bulletin," Resolution Performance Products (Houston, TX) RP:4048 (Mar. 2005).

"3M Aircraft Belly Protective Tape 8641 Technical Data Sheet," Minnesota Mining & Manufacturing Co. (St. Paul, MN) Publication No. 70-0703-7681-2 (Mar. 2007).

"3M Paint Protection Film Builds Business through the SEMA Show," 3M Holding Fast, 3M Automotive Division (St. Paul, MN), 1 (25) (2002).

"3M Paint Protection Film: A Clear Alternative to Vehicle Bras or Guards," 3M Automotive Aftermarket Division 75-3467-9992-9, Minnesota Mining & Manufacturing Co. (St. Paul, MN) (2003).

"3M Polyurethane Protective Tape 8672/8672 GB Technical Data Sheet," Minnesota Mining & Manufacturing Co. (St. Paul, MN) Publication No. 78-9236-7045-5 (Nov. 2004).

"3M Polyurethane Protective Tape 8674/8674DL Technical Data Sheet," Minnesota Mining & Manufacturing Co. (St. Paul, MN) Publication No. 60-9700-0074-5 (Nov. 2005).

"SABIC Innovative Plastics™ Lexan SLX Resin," SABIC-PLA-829, retrieved on Sep. 12, 2017 from http://www.pod-sabic-ip.com/KBAM/Reflection/Assets/Thumbnail/8457_15.pdf (Dec. 2008).

"AircraftLog: Where Smart Solutions Take Flight," PPG Industries, Inc. (Huntsville, AL). (May 2005), pp. 10-11 and 16.

Umamaheswaran, Venkatakrishnan et al., "New Weatherable Ffifilm Technology to Eliminate Painting of Automotive Exteriors," Society of Automotive Engineers: 2001-01-0443, (2001).

Shaoming, Fang, et al., "Polymer Material Molding Engineering," The First Edition, China Light Industry Press, p. 134 (Jun. 1, 2014).

Wagner, Matthias, "Thermal Analysis in Practice," The First Edition, Lu Liming, Donghua University Press, pp. 146-148 (Jan. 1, 2011).

(56) References Cited

OTHER PUBLICATIONS

"3M FTA 9055 J-3M™ Premium Plus Blackout Film with Comply™ Feature", Technical Data Sheet FTA 9055 J E _01/MW, Rev. 1, Ref. TL-10177, retrieved on Sep. 12, 2017 from http://multimedia.3m.com/mws/media/880023O/3m-premium-plus-blackout-film-with-comply-feature.pdf (Jun. 2008).
"3M Paint Replacement Film F577," Technical Data Sheet, retrieved on Sep. 12, 2017 from https://multimedia.3m.com/mws/media/514553O/3mtm-paint-replacement-film-f577.pdf (Mar. 2017).
"3M™ Paint Replacement Films with Comply™ Adhesive Performance," Technical Bulletin, retrieved on Sep. 12, 2017 at http://multimedia.3m.com/mws/media/557534O/3m-paint-replacement-film-with-comply-adh-perf-tech-bulletin.pdf (Nov. 2008).
"Laminating Problems and Solutions," Mactac Technical Bulletin 7.8, vol. 2, retrieved on Sep. 13, 2017 from http://www.mactac.eu/datas/files/Technical%20Bulletin%207%208%20Laminating%20problems%20%20solutions.pdf (Sep. 2012).

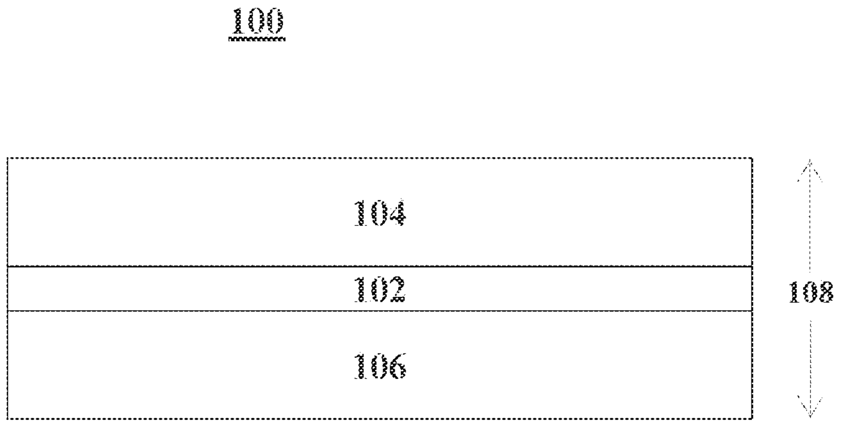
100
104
102
106
108

PROTECTED GRAPHICS AND RELATED METHODS

CROSS-REFERENCE TO RELATED APPLICATIONS

This application is a continuation of U.S. patent application Ser. No. 18/108,784, filed Feb. 13, 2023, which is a continuation of U.S. patent application Ser. No. 17/160,732, filed on Jan. 28, 2021, now U.S. Pat. No. 11,577,501, issued Feb. 14, 2023, which is a continuation of U.S. patent application Ser. No. 12/017,031, filed on Jan. 19, 2008, now U.S. Pat. No. 10,981,371, issued Apr. 20, 2021, all of which are incorporated herein by reference in their entireties.

BACKGROUND

The present invention relates generally to improved protected graphics and methods related to the same, which graphics and related methods are particularly useful for application to vehicles according to an exemplary aspect of the invention.

Graphical images (also referred to simply as "graphics") take many forms and are used to provide desired textual or pictorial representations on a surface. A wide variety of materials are used to create graphical images on a surface, and graphics can generally be applied to a wide variety of surfaces. With that in mind, graphic designers face many challenges. A primary challenge is associated with successful application of a graphical image having a desired quality on a surface. Another challenge is associated with maintaining those applied graphics over time. As an example, materials used to create graphical images on a surface are prone to fading when exposed to radiation such as that in ultraviolet (UV) light. Mechanical (e.g., abrasive) or chemical contact with graphical images also tends to degrade such graphics over time. Quality of a graphical image is often balanced against a competing interest in permanence of that image.

In order to increase permanency of graphical images, ink used to create such images is often formulated with additives that improve mar resistance or other performance properties of the ink. Such additives include, for example, silicones and other low surface energy materials. A problem arising from the use of such relatively low surface energy additives, however, is the tendency of low surface energy additives to decrease the adherence of the inks to many substrates. Thus, while the ink itself may be improved with respect to its ability to resist degradation, the ink may not adequately adhere to the surface on which it is printed to form a graphical image, which can affect both the quality and the permanence of the image.

Another attempt to increase permanency of graphical images is application of the graphics under a film such that the graphics are outwardly visible, but yet protected, on a surface. Using this approach, graphics can be printed on a polymer film and adhered to a surface such that the graphical image lies between the polymer film and an underlying surface. The types of polymer films conventionally used in this approach are generally polyesters or fluoropolymers. Quality of the graphical image is often compromised, however, as the visual quality of the polymer film is generally not sufficient to allow undistorted viewing of the underlying graphics.

Further, conventional inks used to form such graphical images, which often have low surface energy additives as discussed above, often do not adequately adhere to adjacent polymer films or the low surface energy of an adjacent polymer film, such as a fluoropolymer film, can impair such adherence. Adherence is not only a factor as far as maintenance of graphics on a surface is concerned, but it is also a factor associated with case of removability of such graphics when desired. For example, as team sponsorship or other insignia placed on a race car or other transportation vehicle changes, it is often desirable to easily remove outdated graphics from a vehicle's surface so that updated graphics can be applied in their place. When the graphics are part of an assembly containing multiple layers, interlayer delamination associated with inadequate adherence between layers can complicate the removal process.

A further consideration associated with protecting graphics with a polymer film overlay is weight associated with the polymer film. Particularly in the transportation industry, additional weight may lead to consumption of excess fuel and restrictions on the number of passengers or amount of cargo that an associated vehicle can safely and efficiently transport. Additional weight can also compromise operation of high-performance vehicles, such as race cars. For example, as weight restrictions are often imposed on race cars, additional weight associated with surface paint or film decreases the amount of weight that can be strategically positioned elsewhere on the vehicle-such as in areas designed to increase the downforce (i.e., the downward pressure created by the aerodynamic characteristics of a car that allows it to travel faster through a corner by holding the car to the track or road surface) and, hence, performance of a race car. In particular, NASCAR's "Car of Tomorrow" is highly standardized, with more than two-hundred defined points that must be adhered to when designing a race car. Impacted by these new standards is aerodynamics of the race car. Making race cars wider and taller according to the new standards typically results in a corresponding sacrifice in aerodynamics, resulting in a slower average speed for the race car on a track. Thus, optimizing aerodynamic performance of a race car, which is impacted by the geometry and materials associated with a vehicle's surface, is highly desirable and of increasing concern.

Specific examples of some of the foregoing approaches to protecting graphics are now described. In setting forth the background of their teachings, U.S. Patent Publication No. 2007/0036929 (Boeing) describes how a conventional decal system (typically having a thickness of around 5 mils (125 microns)) consists of a clear polymer film provided to a printer, who prints graphics on the bottom side of the film, then applies pressure-sensitive adhesive.

According to the disclosure of this Boeing patent publication, thin film appliqués are prepared for application to aircraft and, after their application, include a polymer film, a pattern layer, a pressure-sensitive adhesive, and an overlying clearcoat. Polymer films described therein are urethane, acrylic, epoxy, vinyl, or polyester and have a thickness of between 0.5 mil (13 microns) and 1.0 mil (25 microns). Pattern layers, which may embody graphics, are said to be formed from acceptable commercial-off-the-shelf inks, including pigmented acrylic ink, pigmented fast-dry acrylic ink, urethane ink with pigment, epoxy ink, and urethane enamel coating such as DESOTHANE brand coatings (available from PRC Desoto International, Inc. of Glendale, Calif.). The systems therein are described as being applicable to an aircraft skin, after which time edge sealer (e.g., a clearcoat) is applied around its borders. The clearcoat is substantial, having a thickness equalized toward a combined thickness of the remaining layers—i.e., the polymer film, the pattern layer, and the pressure-sensitive adhesive.

The clearcoat is said to provide a smooth finish, a high gloss on the order of around 80-90 gloss units, and resistance to impacts and degrading fluids. However, the systems described in the Boeing patent publication are often not able to protect surfaces from damage arising from surface impact with stones and other debris, such as that hazardous debris often encountered by race cars during a race. Further, the need for a clearcoat in order to obtain desired gloss on the outer surface undesirably increases weight of the assembly.

PCT Patent Publication No. WO2007/048141 (Entrotech Composites, LLC) describes how, when printed material is included on an exterior surface of a composite article, addition of a protective coating after application of the printed material on the surface is not required. Any printed material desired to be placed on an exterior surface of a composite article is pre-printed onto a protective sheet prior to its bonding to the underlying composite article. The protective sheet is then applied to the surface of an underlying composite article such that the printed material is outwardly visible. Protective sheets described therein have enhanced durability (e.g., abrasion resistance), impact resistance, and fracture toughness and are stated to be useful in a range of indoor and outdoor applications—for example, the transportation, architectural and sporting goods industries. However, as the protective sheets described therein are integrally bonded to the underlying surface, they are not easily removable from such surfaces or capable of being selectively applied to, for example, a race car's surface after manufacture and assembly of the car. Similar restrictions are associated with the graphic image fusion in-molded and extruded parts described in U.S. Pat. No. 7,166,249 (Abrams et al.).

U.S. Pat. No. 7,048,989 (3M Innovative Properties Co.) describes sheeting that may comprise a graphic. The graphic may be exposed on the viewing surface of the sheeting or disposed between a topcoat and the viewing surface of the sheeting. The topcoats are typically digitally printed by at least one method selected from laser printing, ink-jet printing, and thermal mass transfer printing. The topcoat is preferably reverse-imaged and then disposed such that the image is between the topcoat and a retroreflective core. It is stated that the retroreflective sheeting having the water-borne acrylic based topcoat may be used for a variety of uses such as traffic signs, license plates, pavement markings (e.g., raised pavement markings), personal safety, vehicle decoration and commercial graphics such as retroreflective advertising displays, bus wraps, etc.

U.S. Pat. No. 7,141,294 (3M Innovative Properties Co.) describes a decorative film using no appreciable amount, or no amount, of polyvinyl chloride. This decorative film comprises a substrate, an adhesive layer for sticking the decorative film to an adherend formed on one surface of the substrate, a printed layer provided with a printed decorative pattern or character information formed on the other surface of the substrate, and a top clear layer for protecting the printed layer. The substrate is formed from an ethylene-(meth)acrylic acid copolymer. The top clear layer used as an outer-most layer is preferably made of a material that is superior in weatherability and water resistance and has high transparency (e.g., colorless coating compositions such as fluororesins, thermosetting urethanes, and ultraviolet-curing compositions). The decorative film is described as having flexibility for adhering, ink adhesion, water resistance, and weatherability with good balance. It is also described as being suitable for various adherends, particularly for adhering to buildings or vehicles used outdoors, including curved surfaces such as the body of vehicles.

Despite the number of methods conventionally used for application and maintenance of graphics of the desired quality, improvements in that regard are desired. For example, it would be desirable to provide a film comprising protected graphics without requiring additional layers to protect the graphics or enhance gloss value of the underlying layers within the film. Particularly in the race car industry, such a film would facilitate obtainment of the ever-desired optimized aerodynamic performance.

SUMMARY

An improved protected graphics assembly according to the invention comprises the following sequential layers: optionally, at least one adhesive layer; at least one graphics layer; and at least one outwardly exposed polymer layer that is essentially free of low surface energy materials and has a gloss value of greater than 90 when tested according to ASTM D2457-03 at a 60-degree angle. In a further embodiment, the assembly consists essentially of an outwardly exposed polymer layer, a graphics layer underlying the polymer layer, and, optionally, one adhesive layer.

In an exemplary embodiment, the polymer layer is polyurethane-based. Further, in an exemplary embodiment, the adhesive layer comprises a pressure-sensitive adhesive. Still further, in an exemplary embodiment, the graphics layer comprises ink. The graphics layer can be continuous or discontinuous.

While thickness of the assembly can vary, in one embodiment the protected graphics assembly has a thickness of about 150 microns or less. In another embodiment, the protected graphics assembly has a thickness of about 100 microns or less. In yet another embodiment, the protected graphics assembly has a thickness of about 50 microns or less. In a further embodiment, the protected graphics assembly has a thickness of about 30 microns or less.

Within the assembly, the graphics layer has a thickness of about 5 microns to about 8 microns in one embodiment. With respect to the polymer layer, in one embodiment the polymer layer has a thickness of about 10 microns to about 50 microns. In another embodiment, the polymer layer has a thickness of about 25 microns or less.

In one embodiment, an article comprises at least one surface having on at least a portion thereof a protected graphics assembly of the invention. A variety of articles (e.g., motorized vehicles such as a race car) benefit from protected graphics assemblies of the invention. An exemplary race car comprises a protected graphics assembly on at least one portion of at least one surface thereof, wherein the protected graphics assembly comprises: optionally, at least one adhesive layer; at least one outwardly exposed polymer layer that is essentially free of low surface energy materials; and at least one graphics layer substantially protected from exterior exposure by the polymer layer. In an exemplary embodiment where performance is optimized, a portion of a protected graphics assembly applied to a front, exterior surface of a race car has a greater thickness than that applied elsewhere on the exterior surface of the race car.

Methods of the invention include a method of providing protected graphics on a surface. For example, such a method comprises: providing a protected graphics assembly of the invention and adhering the protected graphics assembly to at least a portion of a surface. In an exemplary embodiment, the surface comprises an exterior surface of a race car. According to one aspect of a method of the invention, a protected graphics assembly has a first thickness and is adhered to a front surface of the race car as a first protected graphics assembly. The method further comprises providing a second protected graphics assembly having a second thickness greater than the first thickness and adhering the second protected graphics assembly to at least a portion of the exterior surface of the race car other than the front surface.

BRIEF DESCRIPTION OF THE DRAWING

FIG. 1 illustrates a cross-sectional representation of one embodiment of a protected graphics assembly 100 of the invention, wherein a graphics layer 102 is interposed between an outwardly exposed polymer layer 104 and an adhesive layer 106. The overall thickness of the protected graphics assembly is illustrated therein by reference number 108.

DETAILED DESCRIPTION

Protected graphics of the invention are assemblies generally including a polymer layer and, optionally, an adhesive layer with a graphics layer disposed adjacent the polymer layer such that the graphics layer is outwardly visible yet protected from mechanical and chemical exposure from the surrounding environment. In a preferred embodiment, the polymer layer, the graphics layer, and the optional adhesive layer are selected to be chemically compatible with each other in order to improve interlayer adhesion of the protected graphics assembly. For example, material properties contributing to high chemical affinity of the various layers with each other are identified and selected according to this embodiment of the invention. According to one aspect of this embodiment, the surface tension of each layer is within about 5 dynes per centimeter of the surface tension of adjacent layers therein. According to another aspect of this embodiment, the chemistries of adjacent layers within the protected graphics assembly are selected such that covalent bonds form between the layers. Each of the layers is described in further detail below.

Graphics Layer

While more than one graphics layer can be used to form graphical images in protected graphics assemblies of the invention, the following description is made with reference to one such layer for simplicity only. Recognize that, if multiple graphics layers are used, each graphics layer can be the same or different.

The graphics layer comprises any suitable material and provides desired aesthetics or required insignia. The graphics layer can be a continuous or discontinuous layer.

In an exemplary embodiment, the graphics layer comprises ink. Any suitable commercially available ink can be used. Non-limiting examples of suitable inks include pigmented acrylic ink (including pigmented fast-dry acrylic ink), pigmented urethane ink, epoxy ink, and a urethane enamel coating such as that sold by PRC-Desoto International, Inc. of Sylmar, Calif. under the trade designation, DESOTHANE HS. A number of suitable inks are commercially available from Entrochem, Inc. (Columbus, Ohio) as identified by the following ink codes and associated ink colors: eca-301 (white), eca-305 (red), eca-306 (yellow), eca-307 (black), and eca-316 (blue).

If desired, an adhesion promoter may be included in the graphics layer. However, in preferred embodiments, the material comprising the graphics layer is selected to be chemically compatible with adjacent layers of the paint replacement film. Thus, an adhesion promoter is not generally required according to preferred embodiments of the invention.

The graphics layer generally comprises at least one material imparting desired color to the layer or portion thereof. Any suitable additives can optionally be used in the graphics layer. For example, stabilizers (e.g., antioxidants, heat stabilizers, and UV-stabilizers), crosslinkers (e.g., aluminum or melamine crosslinkers), corrosion inhibitors, plasticizers, photocrosslinkers, additional colorants, fillers, and other conventional additives as known to those of ordinary skill in the art can be incorporated into the graphics layer.

Preferably, the graphics layer is essentially free of low surface energy additives, where such components may promote interlayer delamination or otherwise detrimentally affect the adherence of the protected graphics to adjacent surfaces or layers.

The graphics layer comprises any suitable thickness. However, the graphics layer need only be thick enough to provide the desired quality of image. In an exemplary embodiment, the graphics layer has a maximum thickness of about 25 microns, preferably about 5 microns to about 8 microns.

Polymer Layer

While more than one polymer layer can be used in protected graphics of the invention or the polymer layer can comprise more than one distinct polymer, the following description is made with reference to one such layer and type of polymer within that layer for simplicity only. Recognize that, if multiple polymers or polymer layers are used, each polymer or polymer layer can be the same or different.

The polymer layer comprises any suitable material and provides protection for the underlying graphics layer. As an example, the polymer layer comprises a urethane film or an acrylic film in an exemplary embodiment.

Generally, the polymer layer is essentially free of vinyl, such as polyvinyl chloride (PVC), polyvinylidene fluoride (PVDF), or general polyvinyl fluoride (PVF) (e.g., that available from DuPont under the TEDLAR trade designation), as vinyl films typically are not adequately glossy. In certain applications, it is preferred that the polymer layer comprises a film having a gloss value of greater than 90 when tested according to ASTM D2457-03 at a 60-degree angle. As the polymer layer has such a significant gloss value according to these preferred embodiments, there is generally not a need for an additional topcoat (e.g., clearcoat) layer in assemblies according to the invention. Beneficially, this minimizes weight and dimensions of the assembly.

Further, generally the polymer layer is essentially free of low surface energy materials (e.g., silicones and fluoropolymers), which tend to promote interlayer delamination. Preferably, the polymer layer is polyurethane-based. The polymer layer is preferably polyurethane-based in that it comprises any suitable polyurethane material.

For simplicity, the term "polyurethane" is sometimes used herein to reference polymers containing urethane (also known as carbamate) linkages, urea linkages, or combinations thereof (i.e., in the case of poly(urethane-urea)s). Thus, polyurethanes of the invention contain at least urethane linkages and, optionally, urea linkages. Many commercially available types of polyurethane are available and suitable for use as polyurethane-based polymer layers according to the invention. For example, polyurethanes are available from Thermedics (Noveon, Inc.) of Wilmington, Mass., under the TECOFLEX trade designation (e.g., CLA-93AV) and from Bayer MaterialScience LLC of Pittsburgh, Pennsylvania, under the TEXIN trade designation (e.g., an aliphatic, ester-based polyurethane available under the trade designation, TEXIN DP7-3008).

Any suitable additives can optionally be included in the polymer layer. For example, stabilizers (e.g., antioxidants, heat stabilizers, and UV-stabilizers), crosslinkers (e.g., aluminum or melamine crosslinkers), binders, corrosion inhibitors, plasticizers, photocrosslinkers, colorants, fillers, and other conventional additives as known to those of ordinary skill in the art can be incorporated into the polymer layer. Nevertheless, in order to facilitate viewing of the underlying graphics layer, the polymer layer is generally clear. Thus, additives are selected accordingly.

Preferably, the polymer layer is essentially free of components that may tend to migrate to the outer surface of the protected graphics assembly or to an interface therein, where such components may promote interlayer delamination or otherwise detrimentally affect the adherence of the protected graphics assembly to adjacent surfaces or layers. The polymer layer is also preferably resistant to chemicals to which it may be exposed during use. For example, it is preferred that the polymer layer is resistant to degradation by water and hydraulic fluids. It is also preferred that the polymer layer is thermally resistant to temperatures to which it may be exposed during use.

The polymer layer comprises any suitable thickness. In one embodiment, the polymer layer has a thickness of about 10 microns to about 50 microns. In an exemplary embodiment, the polymer layer is about 25 microns thick or less. It has been found that use of a relatively thin polymer layer contributes to superior flexibility of the protected graphics assembly when applying the same to a surface. Such flexibility allows protected graphics assemblies of the invention to be effectively used in covering articles (e.g., aircraft) having curved or other non-planar surfaces.

Optional Adhesive Layer

While more than one adhesive layer can be used in protected graphics assemblies of the invention, or the adhesive layer can comprise more than one distinct adhesive, the following description is made with reference to one such layer and type of adhesive within that layer for simplicity only. Recognize that, if multiple adhesives or adhesive layers are used, each adhesive or adhesive layer can be the same or different.

The adhesive layer comprises any suitable material. According to one embodiment, the adhesive layer generally comprises a base polymer with one or more additives. While any suitable chemistry can be used for the base polymer in the adhesive layer, (meth)acrylate-acrylate and methacrylate-chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, polyisoprene or copolymers thereof, and silicones (e.g., polydimethylsiloxane and polymethylphenylsiloxane). In a preferred embodiment, the adhesive layer comprises a pressure-sensitive adhesive (PSA).

Any suitable additives can optionally be used in conjunction with the base polymer in the adhesive layer. For example, stabilizers (e.g., antioxidants, heat stabilizers, and UV-stabilizers), crosslinkers (e.g., aluminum or melamine crosslinkers), corrosion inhibitors, tackifiers, plasticizers, photocrosslinkers, colorants, fillers, and other conventional adhesive additives as known to those of ordinary skill in the art can be incorporated into the adhesive layer.

Preferably, the adhesive layer is essentially free of components that may tend to migrate to the outer surface of the protected graphics assembly or to an interface therein, where such components may promote interlayer delamination or otherwise detrimentally affect the adherence of the protected graphics assembly to adjacent surfaces or layers. The adhesive layer is also preferably resistant to chemicals to which it may be exposed during use. For example, it is preferred that the adhesive layer is resistant to degradation by water and hydraulic fluids.

The adhesive layer comprises any suitable thickness. In one embodiment, the adhesive layer has a thickness of about 5 microns to about 150 microns. In a further embodiment, the adhesive layer has a thickness of about 30 microns to about 100 microns. In an exemplary embodiment, the adhesive layer is about 25 microns thick or less. However, the thickness of the adhesive layer can vary substantially without departing from the spirit and scope of the invention.

Applications

Protected graphics assemblies of the invention are prepared according to any suitable method and according to principles known to those skilled in the art. In an exemplary embodiment, the graphics layer is reverse-printed on the polymer film, followed by adherence of the optional adhesive layer to the graphics layer. Any method of printing can be used in such a method. Conventional ink jet printing as known to those of ordinary skill in the art was found to be suitable for most applications.

Until the protected graphics assembly is adhered to a surface, it can be stored with an optional release liner adjacent the optional adhesive layer and with an optional carrier on the opposite side thereof. The selection and use of such carriers and liners is within the knowledge of one of ordinary skill in the art.

When applied, protected graphics assemblies can cover substantially all of or select portions of exterior surfaces on a variety of articles, such as those used in the transportation, architectural and sporting goods industries. Protected graphics assemblies of the invention are capable of providing all desired performance and aesthetic properties in an assembly of relatively thin dimension. Assemblies that are relatively thin enhance, for example, flexibility of the protected graphics assembly and, thus, improve the case of application and adherence to non-planar surfaces. In this regard, preferably protected graphics assemblies of the invention have a total thickness of less than about 150 microns, more preferably less than about 125 microns, even more preferably less than about 100 microns, still more preferably less than about 75 microns, and most preferably less than about 50 microns.

In an exemplary embodiment, a thicker protected graphics assembly is applied to select portions of such surfaces as compared to that applied to other portions of the same surface. For example, an assembly having a total thickness of about 150 microns can be applied to the front surface of a race car or other transportation vehicle, which generally encounters greater surface impact from stones and other debris, while an assembly having a total thickness of about 30 microns can be applied elsewhere on the exterior surface of such a vehicle. Application of protected graphics assemblies in this manner tends to lower the overall weight of the vehicle and conserve fuel consumption among other benefits. In addition, as the protected graphics assemblies of the invention are capable of providing desired performance properties (e.g., impact resistance and wind resistance at a lower weight) and aesthetics (e.g., sufficiently high gloss values) as compared to traditional graphics assemblies for such applications, their application to such vehicles is highly beneficial.

Protected graphics assemblies of the invention can be applied to a surface according to principles and methodologies understood by those of ordinary skill in the art. For example, the release liner, if present, is first removed. Then, the surface to which the protected graphics assembly is to be adhered is sprayed with a cleaning and/or anti-slip agent (e.g., a mixture of three parts water to one part isopropanol). The bottommost layer (e.g., optional adhesive layer, when present, or graphics layer) of the protected graphics assembly may also be sprayed with such an agent. Once the protected graphics assembly is positioned over the surface to which it is to be applied, the film may also be sprayed with such an agent. Thereafter, the protected graphics assembly is firmly adhered to the underlying surface using, for example, a squeegee. Excess cleaning and/or anti-slip agent is then removed from the surface and the film is allowed to set for a time sufficient to prevent inadvertent removal of the film upon removal of any carrier used in conjunction therewith. The carrier, if used, is then removed.

Protected graphics assemblies of the invention are capable of being effectively and durably adhered to the exterior surface of a variety of articles. Not only do such assemblies provide protection for underlying graphics, but they also provide such protection without detracting from the quality of the graphics. Due to the relatively thin dimensions of the protected graphics assembly (e.g., even as thin as about 30 microns or less in certain embodiments), application of the assembly to a surface does not significantly increase weight of the overall article to significantly compromise performance of the article. Further, replacement of paint, graphic decals, or other surface materials with protected graphics assemblies of the invention can result in significant weight savings. Weight savings of this type are particularly advantageous when applying such protected graphics assemblies to race cars, where ever-increasingly stringent weight restrictions are applied. For example, weight otherwise associated with coverings on a race car's exterior surface can be strategically positioned elsewhere on the vehicle-such as in areas designed to increase the downforce and, hence, performance of a race car.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

What is claimed is:

1. A protected graphics assembly, comprising:

an adhesive layer;

an outwardly exposed polymer layer essentially free of low surface energy materials and having a gloss value of greater than 90 when tested according to ASTM D2457-03 at a 60-degree angle; and a graphics layer interposed between the adhesive layer and the outwardly exposed polymer layer;

wherein the polymer layer is essentially free of polyvinyl chloride.

2. The protected graphics assembly of claim 1, wherein the polymer layer is essentially free of silicone and/or fluoropolymer.

3. The protected graphics assembly of claim 1, wherein a surface tension of each layer is within 5 dynes per centimeter of a surface tension of layers adjacent thereto.

4. The protected graphics assembly of claim 1, wherein:

the adhesive layer has a thickness of 5 microns to 150 microns;

the polymer layer has a thickness of 10 microns to 50 microns; and/or the graphics layer has a maximum thickness of 25 microns.

5. The protected graphics assembly of claim 1, wherein the adhesive layer comprises a (meth)acrylate.

6. The protected graphics assembly of claim 1, wherein the adhesive layer comprises an additive.

7. The protected graphics assembly of claim 1, wherein the adhesive layer is essentially free of components that migrate to an outer surface of the graphics assembly and/or to an interface therein.

8. The protected graphics assembly of claim 1, wherein the polymer layer comprises a urethane film and/or an acrylic film.

9. The protected graphics assembly of claim 1, wherein the polymer layer comprises an additive.

10. The protected graphics assembly of claim 1, wherein the graphics layer is continuous.

11. The protected graphics assembly of claim 1, wherein the graphics layer is discontinuous.

12. The protected graphics assembly of claim 1, wherein the graphics layer comprises a color-imparting material and/or an additive.

13. A vehicle comprising the protected graphics assembly of claim 1 on a surface thereof.

14. The vehicle of claim 13, wherein the vehicle comprises a race car.

* * * * *